United States Patent [19]
Rostoucher

[11] Patent Number: 5,031,393
[45] Date of Patent: Jul. 16, 1991

[54] MOWER

[75] Inventor: Guy Rostoucher, Frauenberg, France

[73] Assignee: Deere & Company, Moline, Ill.

[21] Appl. No.: 546,609

[22] Filed: Jun. 29, 1990

[30] Foreign Application Priority Data

Jul. 6, 1989 [GB] United Kingdom ............... 8915466

[51] Int. Cl.⁵ ............................................. A01D 57/20
[52] U.S. Cl. ....................................... 56/154; 56/192; 198/312
[58] Field of Search .............. 56/153, 154, 157, 189, 56/192, 14.5; 198/312, 317, 315, 316.1

[56] References Cited

U.S. PATENT DOCUMENTS

| | | |
|---|---|---|
| 2,669,829 | 2/1954 | Pugh ............................. 198/317 X |
| 3,214,002 | 10/1965 | Kirkpatrick et al. ............. 56/192 X |
| 4,157,005 | 6/1979 | Orlando et al. ................. 198/313 X |
| 4,232,775 | 11/1980 | Duncan .......................... 198/313 X |

Primary Examiner—William P. Neuder

[57] ABSTRACT

A mower-conditioner has a double windrow attachment, in the form of a belt conveyor, mounted to the rear end thereof, the attachment being swingable vertically about a horizontal transverse pivot axis between a lowered working position, wherein it is disposed for intercepting crop, discharged by the conditioning means and guided by a windrow-forming hood, and conveying the crop to one side of the machine, and a raised inoperative position wherein the conveyor is disposed such that it does not extend either the length or width of the machine by any appreciable amount.

12 Claims, 3 Drawing Sheets

MOWER

BACKGROUND OF THE INVENTION

This invention relates to a mower for cutting crop, and particularly to a mower-conditioner.

Conventional mower-conditioners for harvesting hay, which are drawn by a tractor and which are supported on a pair of wheels, have a disc-type cutterbar at the front feeding either a pair of conditioning rolls or a conditioning impeller housed under a hood. The cut and conditioned crop is directed, at the rear of the machine, into a windrow.

For example, it has been proposed in FR-A-2 483 736 to provide a horizontal conveyor, at the rear of a mower-conditioner at a level above support wheels of the machine, which has a working position in which crop falls onto it from conditioning rolls. The conveyor extends diagonally (in plan view) from the hood outlet to terminate behind the left hand wheel and there discharges the crop. The conveyor is mounted for swinging motion about a vertical pivot near its discharge end, and the conveyor can be swung between its diagonal working position just described to a transverse non-working position in which it is spaced sufficiently behind the hood that the crop issuing from under the hood will fall to the ground before reaching it and will simply be laid down in a normal windrow. The machine (with the conveyor in the non-working position) forms such a windrow in a fist pass over the field, and the conveyor is then moved to its working position and a second pass is made whereupon the crop is discharged by the conveyor onto, or directly beside, the first windrow so a double windrow is thereby produced.

In the conveyor's working position, some part of the crops tends to miss it leading to losses. In its non-working position, on the other hand, the conveyor is still relatively near the ground so that it may sometimes by fouled by obstructions on the ground over which the machine has to pass.

Furthermore, when in the non-working position, the length of the machine is significantly extended, and indeed the balance of the machine (bearing in mind that it runs just on a pair of support wheels) can be affected.

The present invention enables one or more of these disadvantages to be overcome.

SUMMARY OF THE INVENTION

According to the present invention there is provided an improved windrowing attachment for a mower or mower-conditioner.

An object of the invention is to provide a mower or mower-conditioner with a double windrow attachment in the form of a conveyor so mounted that it can be swung between a non-working position away from the path of the crop and a working position in the path of the crop, the working position being such that the crop falls onto and is supported by the conveyor under it and the non-working position being above the working position.

A further object of the invention is to provide a mower or mower-conditioner with a windrow attachment, as stated in the previous object, wherein the attachment is so mounted that when it is in its working position it is free to rise upwardly in response to coming into contact with an obstruction or the like.

Yet another object of the invention is to provide a mower or mower-conditioner with an attachment as described in either one of the previous objects wherein the attachment, when swung to its non-working position, does not extend the length of the machine and remains within the width of the remainder of the machine.

These and other objects will become more apparent from a reading of the ensuing description together with the appended drawings.

BRIEF DESCRIPTION OF THE DRAWINGS

FIG. a side view of a mower-conditioner with a double windrow attachment mounted thereto in accordance with the principles of the present invention and showing the attachment in solid lines in its working position and in broken lines in its non-working position.

DESCRIPTION OF THE PREFERRED EMBODIMENT

Figure 1:
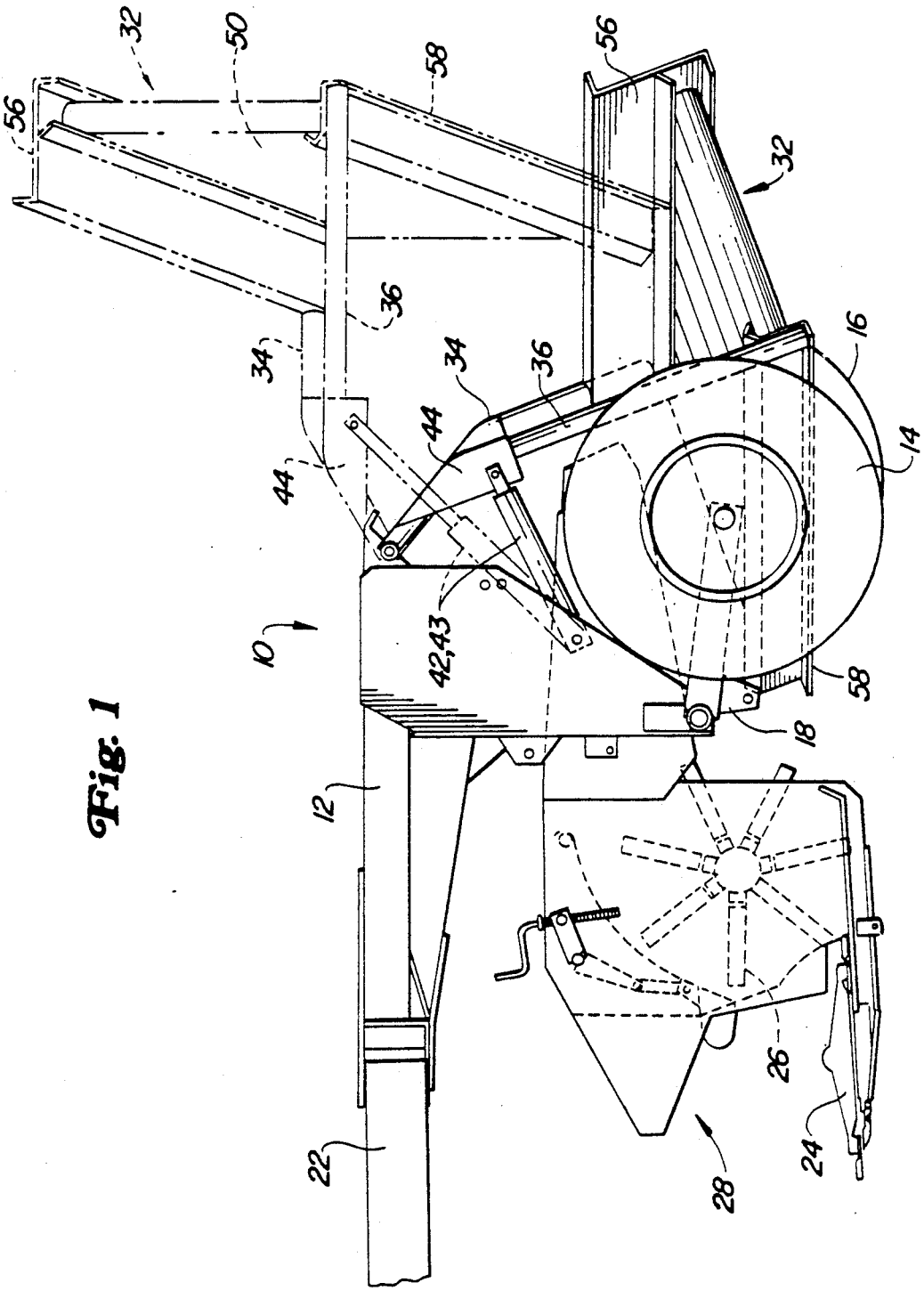

In the drawings, a mower-conditioner 10 has a frame 12 mounted on a pair of left and right wheels 14, 16 by wheel arms 18, 20, respectively. A draft tongue 22 is secured to and extends forwardly from the frame 12 and is adapted for connection to a tractor (not show) which also affords support for the front end of the machine. A disc-type cutterbar 24 runs laterally across the width of the front of the mower-conditioner 10 for delivering cut hay to an impeller 26 aligned therewith and somewhat overlying its rearward portion. The impeller 26 is housed beneath a hood 28, a portion of which is adjustable and which extends both forwardly above the cutterbar 24 and also rearwardly where it forms a converging discharge outlet 30 for the crop. Drive for the cutterbar 24 and impeller 26 is transmitted from the tractor. The mower-conditioner 10 thus far described is conventional.

At the rear of the machine 10 is a double windrow attachment in the form of a conveyor 32. The conveyor 32 is suspended at its right and left ends by right and left cranked support arms 34, 36, respectively, which are mounted on the machine by respective horizontal pivot pins 38, 40. The right hand pivot pin 38 is located outboard of the wheel 16 while the left pin 40 is inboard of the wheel 14. The conveyor 32 is swingable upwardly and downwardly about the pins 38, 40 by way of a pair of left and right one-way hydraulic piston and cylinder units 42,43 of which only the left hand unit 42 is shown in FIG. 1 since it masks the right hand unit and which are pivotally attached at their upper ends to brackets, e.g. bracket 44, rigid with the respective arms 36,34 and at their lower ends to the machine 10, the axes of the units being indicated by lines 46, 48 in FIG. 2.

Figure 2:
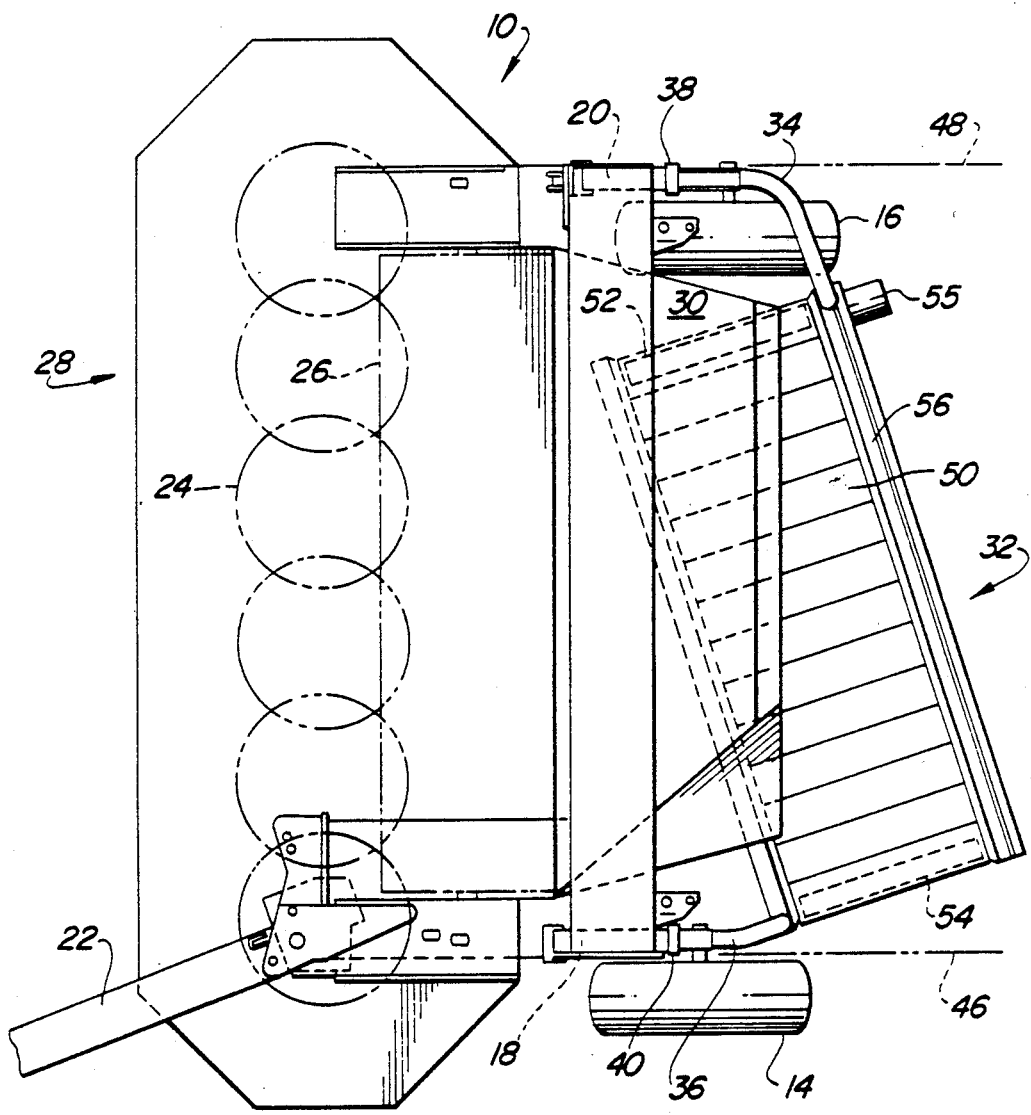
FIG. 2 is a top plan view of the mower-conditioner and double windrow attachment.

The operative position of the conveyor 32 is that indicated in continuous lines in FIGS. 1 and 2. In this position, the conveyor 32, which is rectangular in plan view, extends between the wheels 14, 16 but does not reach the path of the wheels, it being accommodated wholly within the track of the machine 10.

The conveyor 32 has a conveying element 50 formed from a wide belt of rubber, reinforced with polyester fibre, and cross slats of rubber-covered fiberglass attached by adhesive to the belt. The belt runs over end rolls 52, 54 one of which is driven by a hydraulic motor 55 (shown connected to the roll 54 in FIG. 2) and which are journalled in side walls 56, 58 of the conveyor 32. The side walls 56, 58 act as containment walls for the crop, the wall 56 being along the rearward side when the conveyor 32 is inclined at an angle preferably of 10° to 40° to the horizontal so that its rearward side is higher than its forward side. This tilt serves to increase the aggression on the crop. If desired, the forward side wall 58 can be formed to extend (in the operative position) at its upper portion closely toward the impeller 26 so that the wall 58 will catch stray crop, which may otherwise fall between the impeller 26 and the conveyor 32, and direct that crop onto the conveyor.

The inoperative or storage position of the conveyor 32 is shown in broken lines in FIG. 1. Here, the conveyor is approximately upright, being in this embodiment at an angle of about 15° that to the vertical although the precise angle is not critical. What is important is that the inoperative position is higher than the operative position and does not cause any significant increase in the length or width of the machine. It is desirable that the inoperative position overlies the operative position.

Figure 3:
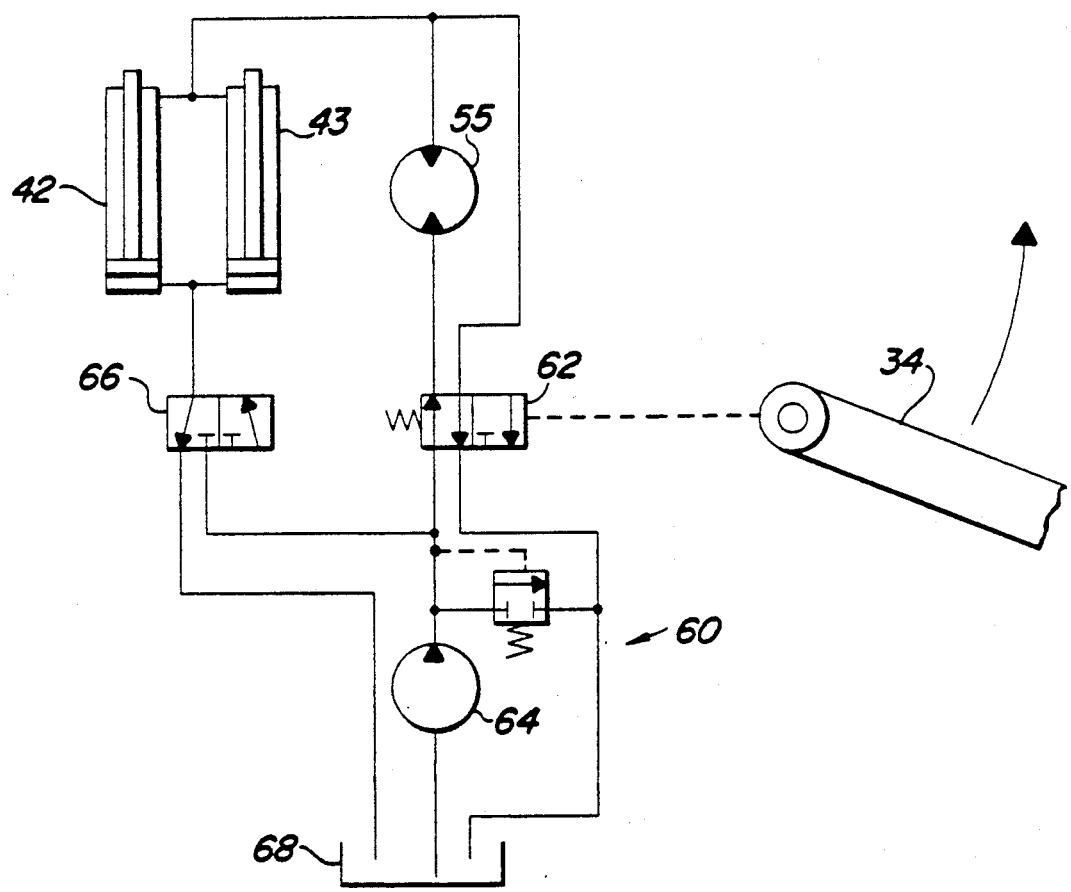
FIG. 3 is a hydraulic circuit showing the valve for controlling the one-way cylinders used for raising the double windrow attachment to its inoperative position and showing the valve which is shifted to terminate operation of the conveyor drive motor in response to movement of the conveyor toward its inoperative position.

As shown in FIG. 3, the hydraulic motor 55 driving the roll 54 is in a hydraulic circuit 60 with a valve 62 arranged to normally direct working fluid from the outlet of a pump 64 to the motor, the valve being shiftable to stop the drive in response to movement of the conveyor 32 to its inoperative position.

The hydraulic circuit also includes a manually operable valve 66 shiftable between a first position, as shown, wherein it connects the piston ends of the cylinders 42, 44 to a sump 68 whereby it establishes a float condition in the cylinders for permitting the conveyor 32 to freely float or ride over obstacles it may encounter when in its working position, and a second position wherein it connects the pump to the head ends of the cylinders 42, 43 whereby the cylinders are extended so as to move the conveyor to its inoperative position.

In operation, for a first pass through a hay crop, the conveyor 32 is in its raised storage position. The hay is severed by the cutterbar 24, passes rearwardly to the impeller 26 where it is conditioned travelling between the impeller 26 and the hood 28, and is discharged through the outlet 30 to form a windrow on the ground. At the end of the pass, the piston and cylinder units are retracted to swing the conveyor 32 downwardly through approximately 90° about the pivot pins 38, 40 to the operative position.

A second pass is then made. The conditioned crop is discharged onto the moving conveyor 50 which ejects the crop at its left hand end onto (or closely beside) the windrow laid down on the first pass so that a double windrow is formed. Since the piston and cylinder units are operated "one-way", they do not resist any upward movement of the conveyor 50. Thus, if the conveyor 50 encounters an obstruction on the ground, it can float or ride over it without damage.

At the third pass, the piston and cylinder units are again extended to return the conveyor 50 to its raised storage position and a single windrow is formed, and the procedure is repeated.

I claim:

1. In a combination of a mower for cutting crop and moving the cut crop rearwardly at a level above the ground and a double windrow attachment connected to the rear end of the mower and being mounted for movement between an inoperative position wherein it permits the crop to drop onto the ground and a working position for intercepting the crop and moving it to one side of the mower, the improvement comprising: said attachment being a belt conveyor; and means mounting the conveyor to the mower for disposing a top surface of the conveyor for having crop deposited thereon when the conveyor is in its working position and for disposing the conveyor above its working position when the conveyor is moved to its inoperative position, whereby the overall length of the machine is not increased when the conveyor is moved to its inoperative position.

2. The combination as defined in claim 1 wherein said means for mounting includes means for disposing the conveyor in an approximate upright position when the conveyor is moved to its inoperative position.

3. The combination as defined in claim 1 wherein said means for mounting includes means for disposing the conveyor such that it inclines upwardly from front to rear when in said working position.

4. The combination as defined in claim 3 wherein said means for disposing the conveyor supports the conveyor at an incline of from 10° to 40° to the horizontal.

5. The combination as defined in claim 1 wherein said means for mounting includes means for supporting the conveyor such that one end thereof is farther forward than another end thereof.

6. The combination as defined in claim 1 wherein said means for mounting includes means for defining a horizontal, transverse pivot axis about which the conveyor is pivotable between its working and inoperative positions.

7. The combination as defined in claim 6 wherein said means for mounting includes a one-way hydraulic cylinder connected to the conveyor so as to move the latter between said working and inoperative positions, the cylinder supporting the conveyor against downward movement when in the working position but not resisting upward movement.

8. The combination as defined in claim 1 wherein the mower includes a disc cutterbar extending transversely to the direction of travel; a conditioning impeller located behind the cutterbar for receiving crop cut by the cutterbar and elevating the crop above the ground; and hood disposed over the impeller so that crop is moved between the impeller and the hood, the hood also partially overlying said conveyor when the latter is in its working position.

9. The combination as defined in claim 8 wherein said conveyor includes a crop-containment wall along its forward side when considered in the working position, the wall being located sufficiently close the conditioning impeller that substantially all crop leaving the conditioning impeller will pass over said wall and be deposited on the conveyor.

10. The combination as defined in claim 8 wherein said mower includes a pair of support wheels rotatably mounted on axles; and said supporting means including means for disposing at least a portion of said top of the conveyor at an elevation below said axles.

11. The combination as defined in claim 1 wherein said conveyor includes a hydraulic drive motor; and a hydraulic control circuit connected to said drive motor and including control means responsive to the movement of said conveyor for discontinuing the flow of working fluid to said motor in response to the conveyor being moved to its inoperative position.

12. The combination as defined in claim 9 wherein said conveyor further includes a rear wall arranged parallel to and being higher than the first-mentioned wall.

* * * * *